(12) United States Patent
Anzai

(10) Patent No.: US 6,672,592 B1
(45) Date of Patent: Jan. 6, 2004

(54) MAGNETIC FLUID SEAL

(75) Inventor: Hiroshi Anzai, Fujisawa (JP)

(73) Assignee: NOK Corporation, Tokyo (JP)

( * ) Notice: Subject to any disclaimer, the term of this patent is extended or adjusted under 35 U.S.C. 154(b) by 20 days.

(21) Appl. No.: 10/019,306

(22) PCT Filed: Jul. 10, 2000

(86) PCT No.: PCT/JP00/04600

§ 371 (c)(1),
(2), (4) Date: Jan. 8, 2002

(87) PCT Pub. No.: WO01/04521

PCT Pub. Date: Jan. 18, 2001

(30) Foreign Application Priority Data

Jul. 9, 1999 (JP) .............................. 11/196194

(51) Int. Cl.[7] ................................ F16J 15/43
(52) U.S. Cl. ..................... 277/410; 277/418
(58) Field of Search ................... 277/410, 418

(56) References Cited

U.S. PATENT DOCUMENTS 4,357,024 A * 11/1982 Raj .......................... 277/302
4,444,398 A * 4/1984 Black et al. ................. 277/302
4,478,424 A * 10/1984 Raj ........................... 277/302
4,526,381 A   7/1985 Ezekiel
4,973,064 A   11/1990 Hosoya
5,876,037 A * 3/1999 Ishizaki et al. ............. 277/410

FOREIGN PATENT DOCUMENTS

| JP | 355135269 A | * | 10/1980 |
| JP | 62-39311 | | 3/1987 |
| JP | 1-140071 | | 9/1989 |
| JP | 2-29321 | | 8/1990 |
| JP | 5-288277 | | 11/1993 |

* cited by examiner

Primary Examiner—William L. Miller
(74) Attorney, Agent, or Firm—Jacobson Holman PLLC

(57) ABSTRACT

A magnetic fluid seal with an excellent quality for reduction of leak of magnetic fluid. Among the projections of the pole pieces, the projections, that are nearest to the permanent magnet, are placed at positions intruding into the permanent magnet sides to hold the magnetic fluid in a space between the projections and the surface of the shaft.

11 Claims, 3 Drawing Sheets

MAGNETIC FLUID SEAL

This is a nationalization of PCT/JP00/04600 filed Jul. 10, 2000 and published in Japanese.

TECHNICAL FIELD

The present invention relates to a magnetic fluid seal that seals various fluids using a magnetic fluid. For instance, it relates to a magnetic fluid seal that is applied as a shaft sealing apparatus used for a semiconductor manufacturing process, a vacuum process, various pneumatic devices or the like.

BACKGROUND ART

As a reciprocating seal for sealing a circular space between a shaft and a housing that reciprocate relatively, there has conventionally been used an elastic seal that is made of an elastic material such as rubber.

In the case where such an elastic seal is used, the elastic seal seals a target member that should be sealed while contacting the target member, and thus there occur problems concerning slide resistance and friction due to sliding motion.

On the other hand, there has been known a magnetic fluid seal as a seal that achieves a sealing effect in a non-contact manner, which does not cause the stated problems.

Magnetic fluid seals according to conventional techniques will be described with reference to FIGS. 5 and 6.

First, a magnetic fluid seal 100 shown in FIG. 5 is provided to seal a circular space between a shaft 300 and a housing 400.

This magnetic fluid seal 100 substantially includes: a circular permanent magnet 101 that is arranged so that one end thereof corresponds to a north pole and the other end thereof corresponds to a south pole in a shaft extending direction; and a pair of pole pieces 102 and 103 that are respectively provided on both sides so that the permanent magnet 101 is sandwiched therebetween.

Here, the housing 400 shown in FIG. 5 is made of a non-magnetic material and a space between the magnetic fluid seal 100 and the interior surface of the housing 400 is sealed with O rings D10 and D20.

On the other hand, the shaft 300 is made of a magnetic material and a space between the magnetic fluid seal 100 and the surface of the shaft 300 is sealed with a magnetic fluid J.

That is, there are formed a plurality of projections 102a, 102b, and 102c on the pole piece 102 and there are also formed a plurality of projections 103a, 103b, and 103c on the pole piece 103. The magnetic fluid J is held by a magnetic force in a space between the tips of these projections and the surface of the shaft 300, thereby achieving a sealing effect.

Also, in the same manner, a magnetic fluid seal 200 shown in FIG. 6 is provided to seal a circular space between a shaft 301 and a housing 401.

Like the magnetic fluid seal 100 shown in FIG. 5 described above, this magnetic fluid seal 200 also includes a permanent magnet 201 and a pair of pole pieces 202 and 203.

Here, the shaft 301 shown in FIG. 6 is made of a non-magnetic material and a space between the magnetic fluid seal 200 and the surface of the shaft 301 is sealed with O rings D30 and D40.

On the other hand, the housing 401 is made of a magnetic material and a space between the magnetic fluid seal 200 and the interior surface of the housing 401 is sealed with a magnetic fluid J.

That is, there are formed a plurality of projections 202a, 202b, and 202c on the pole piece 202 and there are also formed a plurality of projections 203a, 203b, and 203c on the pole piece 203. The magnetic fluid J is held by a magnetic force in a space between the tips of these projections and the interior surface of the housing 401, thereby achieving a sealing effect.

For instance, Japanese Utility Model Application Laid-Open No. Sho 55-20746 discloses a technique with which, between a rotary shaft and a fixed casing, a pair of circular ball blocks is fixed to bearings for holding the rotary shaft, a magnet is also provided between these paired circular ball blocks, and a magnetic fluid is held by this magnetic force between the rotary shaft and projections formed at tips of the circular ball blocks. In this manner, there is achieved a construction in which the rotary shaft is sealed with this magnetic fluid.

Also, Japanese Utility Model Examined Publication No. Sho 63-11427 discloses a technique with which, in a space between a casing and a rotary shaft supported by bearings within the casing, a magnetic fluid is held between the rotary shaft and projections formed on the surfaces of bushes that are fixed to the rotary shaft so that a magnet is sandwiched between these bushes and the rotary shaft. In this manner, there is achieved a construction in which a space between the rotary shaft and the projections formed on the bush surfaces is sealed with the magnetic fluid.

In the cases of the aforementioned conventional techniques, however, there occurs a problem to be described below.

As described above, in the case where a magnetic fluid seal is used, there occur no problem concerning slide resistance and friction due to sliding motion.

However, in the case of a magnetic fluid seal, there occurs a problem that a held magnetic fluid leaks, losing its sealing property.

This problem in which a magnetic fluid leaks rarely becomes serious in the case where a magnetic fluid is applied as a rotary seal for sealing a space between two members that rotate relatively to each other. However, in the aforementioned case where a magnetic fluid is applied as a reciprocating seal for sealing a circular space between a shaft and a housing that reciprocate relatively, it is difficult to prevent leakage of the magnetic fluid. This makes it difficult to apply a magnetic fluid to a reciprocating seal.

This point will be described in more detail by taking, as an example, the magnetic fluid seal shown in FIG. 5 or 6 described above.

The length in the shaft extending direction of each of the permanent magnets 101 and 201 that are respectively shown in FIGS. 5 and 6 is generally set to about 5 mm or longer so as to secure a magnetic force.

Accordingly, in the case of the magnetic fluid seal 100 shown in FIG. 5, there is maintained a distance having a substantially similar length between the projections 102a and 103a of the respective pole pieces 102 and 103 that are provided so that the permanent magnet 101 is sandwiched therebetween. As a result, there is formed a space indicated by reference symbol P in the drawing.

Also, in the same manner, in the case of the magnetic fluid seal 200 shown in FIG. 6, there is maintained a distance having a substantially similar length between the projections 202a and 203a of the respective pole pieces 202 and 203 that are provided so that the permanent magnet 201 is sandwiched therebetween. As a result, there is formed a space indicated by reference symbol Q in the drawing.

Meanwhile, the surfaces of magnetic materials forming these P space and Q space are areas having the strongest magnetic fields.

Accordingly, there are cases where a magnetic fluid that should be held by the projections 102a and 103a or by the projections 202a and 203a leaks to the surface of the magnetic material forming the P space or the Q space. As a result, it becomes impossible to secure a sealing property.

Also, in the case where the moving speeds of a shaft and a housing that reciprocate relatively are high, there may be a case where a magnetic fluid leaks outside of a magnetic fluid seal.

The present invention has been made to solve the aforementioned problem of the conventional techniques, and the object of the present invention is to provide a magnetic fluid seal, which reduces leakage of a magnetic fluid with an excellent quality.

DISCLOSURE OF THE INVENTION

To achieve the above-mentioned object, according to the present invention, a magnetic fluid seal for sealing a circular space between a shaft and a housing, comprises: a magnetic force generating member that is arranged so that one end thereof corresponds to a north pole and the other end thereof corresponds to a south pole in a shaft extending direction; and a pair of magnetic pole members that are respectively provided on both sides so that the magnetic force generating member is sandwiched therebetween, wherein the magnetic fluid seal is characterized in that each of the pair of magnetic pole members includes a plurality of holding projections that extend toward a surface of the shaft and hold a magnetic fluid in a space between the holding projections and the shaft surface, and a distance between holding projections, which are nearest to the magnetic force generating member among the holding projections of the pair of magnetic pole members, is shorter than a length of the magnetic force generating member in the shaft extending direction.

Accordingly, the magnetic fluid is held at positions having strong magnetic field that are placed inward from the positions between which there exists a distance equal to the length of the magnetic force generating member. As a result, it is possible to suppress leakage of the magnetic fluid.

It is preferable that an intercepting seal for intercepting a space between the magnetic force generating member and the shaft surface is provided between the holding projections that are nearest to the magnetic force generating member.

With this construction, it is possible to prevent a situation where the magnetic fluid leaks toward the magnetic force generating member side.

It is preferable that the holding projections, which are farthest from the magnetic force generating member among the holding projections of the magnetic pole members, are provided at positions inward from end surfaces in the shaft extending direction of main bodies of the magnetic pole members, and a distance between the shaft surface and wall surfaces, which oppose the shaft surface and exist at positions outward from the holding projections that are farthest from the magnetic force generating member, is longer than a distance from tips of the holding projections to the shaft surface and also is shorter than the heights of the holding projections.

With this construction, it is possible to suppress a situation where the magnetic fluid held by the holding projections that are farthest from the magnetic force generating member leaks to the outside.

It is preferable that the wall surfaces opposing the shaft surface are each formed as a tapered surface whose distance to the shaft surface is gradually reduced as directing from an outer side to an inner side.

With this construction, it is possible to further suppress the situation where the magnetic fluid held by the holding projections that are farthest from the magnetic force generating member leaks to the outside.

A magnetic fluid seal for sealing a circular space between a shaft and a housing, comprising: a magnetic force generating member that is arranged so that one end thereof corresponds to a north pole and the other end thereof corresponds to a south pole in a shaft extending direction; and a pair of magnetic pole members that are respectively provided on both sides so that the magnetic force generating member is sandwiched therebetween, wherein the magnetic fluid seal is characterized in that each of the pair of magnetic pole members includes a plurality of holding projections that extend toward a surface of the housing and hold a magnetic fluid in a space between the holding projections and the housing surface, and a distance between the holding projections, which are nearest to the magnetic force generating member among the holding projections of the pair of magnetic pole members, is shorter than a length of the magnetic force generating member in the shaft extending direction.

Accordingly, the magnetic fluid is held at positions having a strong magnetic field placed inward from positions between which there exists a distance equal to the length of the magnetic force generating member. As a result, it is possible to suppress the leakage of the magnetic fluid.

Here, it is preferable that an intercepting seal for intercepting a space between the magnetic force generating member and the housing interior surface is provided between the holding projections that are nearest to the magnetic force generating member.

With this construction, it is possible to prevent a situation where the magnetic fluid leaks toward the magnetic force generating member side.

It is preferable that the holding projections, which are farthest from the magnetic force generating member among the holding projections of the magnetic pole members, are provided at positions inward from end surfaces in the shaft extending direction of main bodies of the magnetic pole members, and a distance between the housing interior surface and wall surfaces, which oppose the housing surface and exist at positions outward from the holding projections that are farthest from the magnetic force generating member, is longer than a distance from the tips of the holding projections to the housing inner peripheral surface and is also shorter than heights of the holding projections.

With this construction, it is possible to suppress a situation where the magnetic fluid held by the holding projections that are farthest from the magnetic force generating member leaks to the outside.

It is preferable that the wall surfaces opposing the housing interior surface are each formed as a tapered surface whose distance to the housing interior surface is gradually reduced as directing from an outer side to an inner side.

With this construction, it is possible to further suppress the situation where the magnetic fluid held by the holding projections that are farthest from the magnetic force generating member leaks to the outside.

It is preferable that a taper angle of each of the wall surfaces opposing the housing interior surface is set at 45° or less. Also, it is further preferable that the wall surfaces opposing the housing interior surface are each formed so that the taper angle is set in a range of from 5° to 30°.

It is preferable that the distance between the holding projections that are nearest to the magnetic force generating member is set in a range of from 0.1 to 2 mm. With this construction, it is possible to effectively prevent leakage of the magnetic fluid.

BEST MODE FOR CARRYING OUT THE INVENTION

Preferred embodiments of the present invention will be described in detail below as examples with reference to the drawings. It should be noted here that, unless otherwise specified, there is no intention to limit the scope of the present invention to the sizes, materials, shapes, relative positions, and other aspects of component parts described in the embodiments.

First Embodiment

Figure 1:
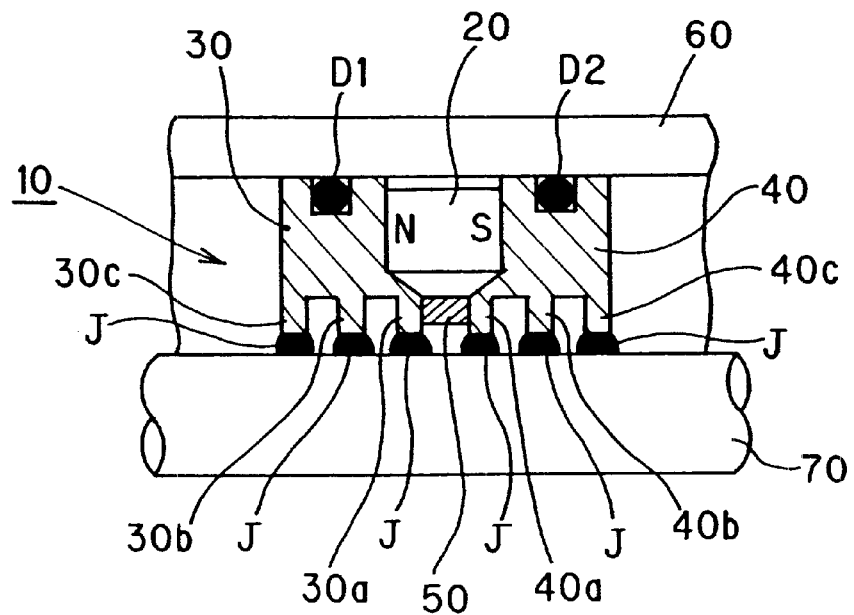
FIG. 1 is a schematic construction diagram showing a usage state of a magnetic fluid seal according to the first embodiment.

A magnetic fluid seal according to a first embodiment will be described with reference to FIG. 1. FIG. 1 is a schematic construction diagram showing a usage state of the magnetic fluid seal according to the first embodiment.

A magnetic fluid seal 10 according to the present embodiment is used to seal a circular space between a shaft 70 and a housing 60. It is possible to effectively use the magnetic fluid seal 10 even in the case where the shaft 70 and the housing 60 reciprocate relatively.

This magnetic fluid seal 10 substantially includes: a circular permanent magnet 20 that functions as a magnetic force generating member and is arranged so that one end thereof corresponds to a north pole and the other end thereof corresponds to a south pole in a shaft extending direction; and a pair of pole pieces 30 and 40 that function as magnetic pole members and are respectively provided on both sides so that the permanent magnet 20 is sandwiched therebetween.

Here, the housing 60 is made of a non-magnetic material and a space between the magnetic fluid seal 10 and the interior surface of the housing 60 is sealed with O rings D1 and D2.

On the other hand, the shaft 70 is made of a magnetic material and a space between the magnetic fluid seal 10 and the surface of the shaft 70 is sealed with a magnetic fluid J.

That is, there are formed a plurality of holding projections (hereinafter, simply referred to as the "projections") 30a, 30b, and 30c on the pole piece 30 and there are also formed a plurality of projections 40a, 40b, and 40c on the pole piece 40. The magnetic fluid J is held by a magnetic force in a space between the tips of these projections and the surface of the shaft 70, thereby achieving a sealing effect.

Here, in this embodiment, among the projections of the pole pieces 30 and 40, the projections 30a and 40a, that are nearest to the permanent magnet 20, are placed at positions intruding into the permanent magnet 20 sides to hold the magnetic fluid J in a space between the projections and the surface of the shaft 70.

Accordingly, the distance between these projections 30a and 40a is shorter than the length of the permanent magnet 20 in the shaft extending direction (if the length of the permanent magnet is 5 mm, for instance, the distance between these projections is set in a range of from 0.1 to 2 mm, and preferably in a range of from about 0.1 to 1 mm). This means that the magnetic fluid J is held at positions having strong magnetic field placed inward from positions between which there exists a distance equal to the length of the permanent magnet 20.

With this construction, it becomes possible to reduce leakage of the magnetic fluid J toward the permanent magnet 20 side.

Also, in the present embodiment, there is obtained a construction where an elastic seal (o ring or the like, for instance) 50 is provided as an intercepting seal for intercepting a space between the permanent magnet 20 and the surface of the shaft 70 while intimately contacting the side surfaces of the projections 30a and 40a, respectively.

With this construction, it becomes possible to prevent a situation where the magnetic fluid J leaks toward the permanent magnet 20.

As described above, with the construction of the present embodiment, the leakage of a magnetic fluid toward a permanent magnet side is reduced, which improves a sealing property.

Figure 5:
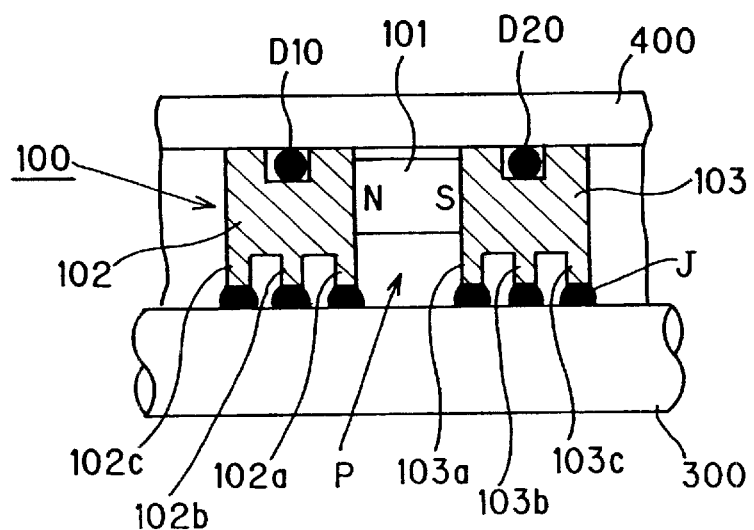
FIG. 5 is a schematic construction diagram showing a usage state of a magnetic fluid seal according to a conventional technique.
Figure 6:
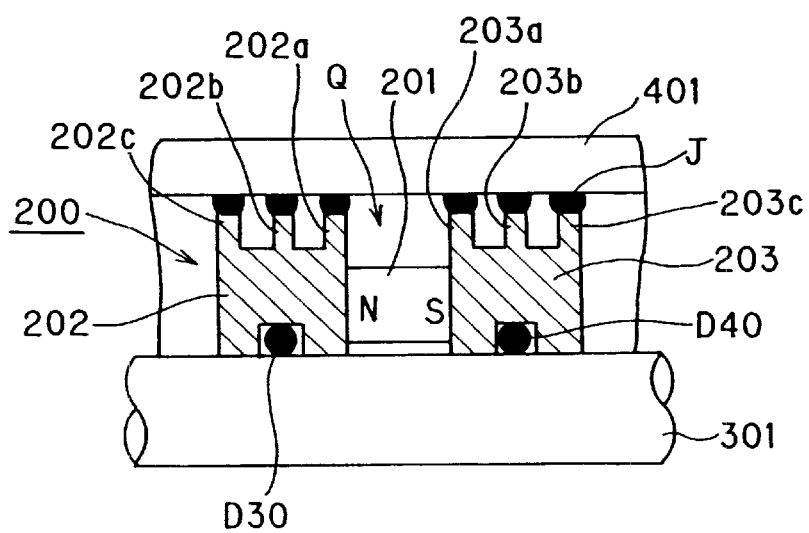
FIG. 6 is a schematic construction diagram showing a usage state of a magnetic fluid seal according to another conventional technique.

Here, as a result of an examination of a reciprocating sealing property (the sealing performance in the case where the shaft and the housing are reciprocated) of the magnetic fluid seal shown in FIG. 5 described above, it was confirmed that the magnetic fluid leaked toward the permanent magnet side by reciprocating the shaft and housing only for a few times and there was reduced the sealing property. On the other hand, as a result of a similar examination of the reciprocating sealing property in the case of the magnetic fluid seal based on the construction of the present embodiment, it was confirmed that there occurred no leakage of the magnetic fluid toward the permanent magnet side and it was possible to secure the sealing performance.

Needless to say, it is possible to effectively use the magnetic fluid seal according to the present embodiment as a rotary seal in the case where a shaft and a housing rotate relatively, or as a seal for an apparatus in which reciprocating motion and rotary motion are performed in a combination manner.

Second Embodiment

Figure 2:
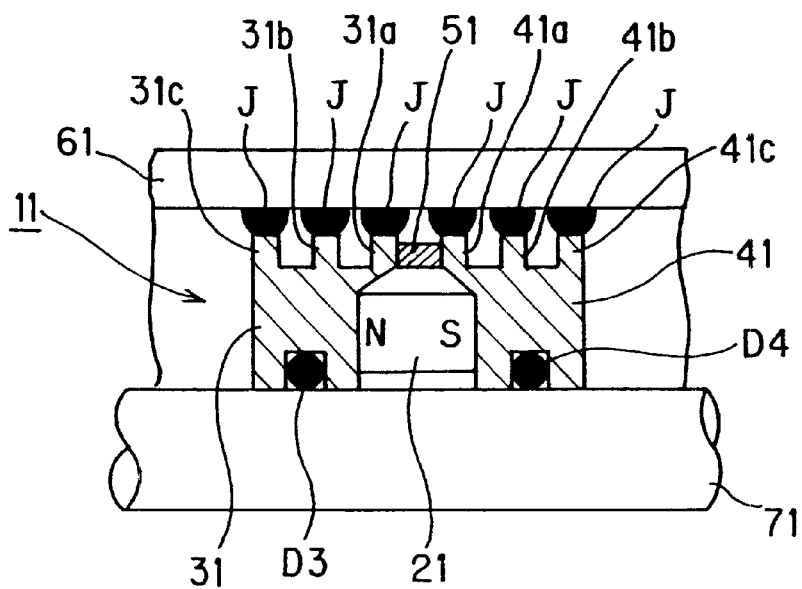
FIG. 2 is a schematic construction diagram showing a usage state of a magnetic fluid seal according to the second embodiment.

FIG. 2 shows a second embodiment. In the aforementioned first embodiment, there has been described a construction in which a magnetic fluid seal uses a magnetic fluid on the shaft side. In the present embodiment, however, there is shown a construction in which a magnetic fluid seal uses a magnetic fluid on a housing interior surface side.

Other constructions and operations are the same as those in the first embodiment. Therefore, the same components will be described using the same reference numerals.

FIG. 2 is a schematic construction diagram showing a usage state of a magnetic fluid seal according to the second embodiment.

A magnetic fluid seal 11 according to the present embodiment is used to seal a circular space between a shaft 71 and a housing 61. It is possible to effectively use the magnetic fluid seal 11 even in the case where the shaft 71 and the housing 61 reciprocate relatively.

This magnetic fluid seal 11 substantially includes: a circular permanent magnet 21 that functions as a magnetic force generating member and is arranged so that one end thereof corresponds to a north pole and the other end thereof corresponds to a south pole in a shaft extending direction; and a pair of pole pieces 31 and 41 that function as magnetic pole members and are respectively provided on both sides so that the permanent magnet 21 is sandwiched therebetween.

Here, the shaft 71 is made of a non-magnetic material and a space between the magnetic fluid seal 11 and the surface of the shaft 71 is sealed with O rings D3 and D4.

On the other hand, the housing 61 is made of a magnetic material and a space between the magnetic fluid seal 10 and the interior surface of the housing 61 is sealed with a magnetic fluid J.

That is, there are formed a plurality of projections 31a, 31b, and 31c on the pole piece 31 and there are also formed a plurality of projections 41a, 41b, and 41c on the pole piece 41. The magnetic fluid J is held by a magnetic force in a space between the tips of these projections and the interior surface of the housing 61, thereby achieving a sealing effect.

Here, in this embodiment, among the projections of the respective pole pieces 31 and 41, the projections 31a and 41a that are nearest to the permanent magnet 21 and placed at positions intruding into the permanent magnet 21 sides hold the magnetic fluid J in a space between the projections and the interior surface of the housing 61.

Accordingly, the distance between these projections 31a and 41a is shorter than the length of the permanent magnet 21 in the shaft extending direction (if the length of the permanent magnet is 5 mm, for instance, the distance between these projections is set in a range of from 0.1 to 2 mm, and preferably in a range of from about 0.1 to 1 mm). This means that the magnetic fluid J is held at positions having strong magnetic field placed inward from positions between which there exists a distance equal to the length of the permanent magnet 21. With this construction, it becomes possible to reduce leakage of the magnetic fluid J toward the permanent magnet 21 side.

Also, in the present embodiment, there is obtained a construction where an elastic seal (O ring or the like, for instance) 51 is provided as an intercepting seal for intercepting a space between the permanent magnet 21 and the interior surface of the housing 61 while intimately contacting the side surfaces of the projection 31a and 41a, respectively.

With this construction, it becomes possible to prevent a situation where the magnetic fluid J leaks toward the permanent magnet 21.

As described above, in the present embodiment, there is obtained the same effect as in the case of the aforementioned first embodiment.

Third Embodiment

Figure 3:
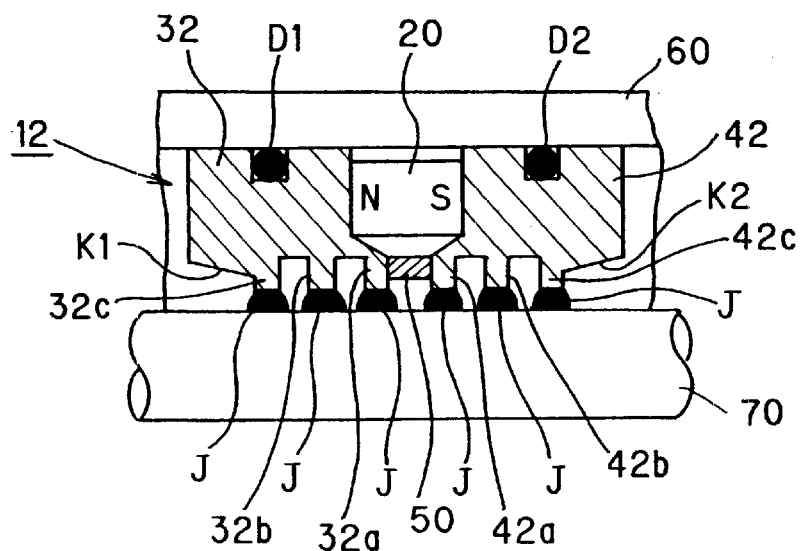
FIG. 3 is a schematic construction diagram showing a usage state of a magnetic fluid seal according to the third embodiment.

FIG. 3 shows a third embodiment. In the aforementioned first embodiment, there has been described a construction in which, among the holding projections of the pole pieces, the holding projections that are farthest from the permanent magnet are provided on extension lines of the end surfaces of the main bodies of the pole pieces. In the present embodiment, however, there is shown a construction in which the holding projections that are farthest from the permanent magnet are provided at positions placed inward from the end surfaces in the shaft extending direction of the main bodies of the pole pieces. In this manner, there is obtained a predetermined space between the shaft and the pole pieces.

Other constructions and operations are the same as those in the first embodiment. Therefore, the same components will be described using the same reference numerals.

FIG. 3 is a schematic construction diagram showing a usage state of a magnetic fluid seal according to the third embodiment.

In this embodiment, in the same manner, there are formed a plurality of projections 32a, 32b, and 32c on a pole piece 32 and there are also formed a plurality of projections 42a, 42b, and 42c on a pole piece 42.

Here, the construction and other aspects of the projections 32a and 32b and the projections 42a and 42b are the same as the construction and other aspects of the projections 30a and 30b and the projections 40a and 40b in the aforementioned first embodiment, and therefore are not described.

The present embodiment differs from the first embodiment only in the construction and the like of the projections 32c and 42c that are provided farthest from the permanent magnet 20. Therefore, this difference will be described in detail.

As shown in the drawing, the projections 32c and 42c are provided at positions that are inward (on the permanent magnet 20 side) from the end surfaces in the shaft extending direction of the main bodies of the respective pole pieces 32 and 42 (from the end surfaces that are far from the permanent magnet 20).

Also, distance to wall surfaces K1 and K2, which oppose the surface of a shaft 70 and exist at positions outward from these projections 32c and 42c (at positions far from the permanent magnet 20), is set so as to be longer than the distance from the tips of these projections to the shaft surface and also to be shorter than the heights of these projections.

By constructing the magnetic fluid seal in the manner described above, the magnetic fluid is held by the capillary attraction of a narrow space enclosed by the surface of the shaft 70 and the wall surfaces K1 and K2 opposing the shaft surface. As a result, it is possible to reduce a leakage amount of the magnetic fluid.

Also, in the present embodiment, the aforementioned wall surfaces K1 and K2 are each formed into like a tapered surface whose distance to the shaft surface is gradually reduced as directing from the outer side to the inner side.

Further, in the present embodiment, the taper angles of these wall surfaces K1 and K2 are set so that these wall surfaces are inclined toward the housing direction at an angle of inclination of 5° to 30° with respect to a horizontal plane. With this construction, it is possible to strengthen the capillary attraction of the narrow space between the surface of the shaft 70 and the wall surfaces K1 and K2 opposing the shaft surface in a direction toward the projections. As a result, it is possible to further reduce the leakage amount of the magnetic fluid.

As described above, with the construction of the present embodiment, it becomes possible to reduce leakage of the magnetic fluid held by the holding projections at positions far from the permanent magnet as well as on the permanent magnet side. This makes it possible to still further improve a sealing property.

Accordingly, it becomes possible to cope with an apparatus in which the reciprocating speeds of a shaft and a housing are high.

With the construction based on the present embodiment, the pressure resistance of a seal is approximately doubled in comparison with a seal having the construction based on the aforementioned first embodiment.

Fourth Embodiment

Figure 4:
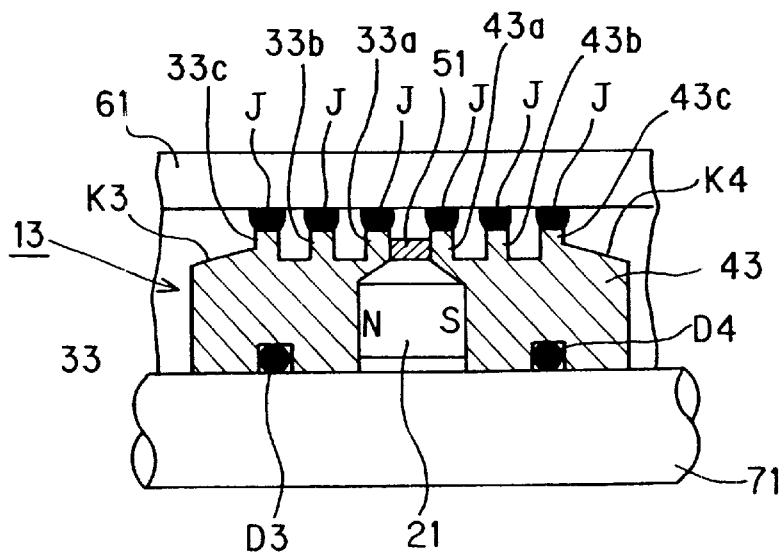
FIG. 4 is a schematic construction diagram showing a usage state of a magnetic fluid seal according to the fourth embodiment.

FIG. 4 shows a fourth embodiment. In the aforementioned second embodiment, there has been described a construction in which, among the holding projections formed on the pole pieces, the holding projections that are farthest from the permanent magnet, are provided on extension lines of the end surfaces of the main bodies of the pole pieces. In the present embodiment, however, there is shown a construction in which the holding projections that are farthest from the permanent magnet are provided at positions placed inward from the end surfaces in the shaft extending direction of the main bodies of the pole pieces. In this manner, there is obtained a predetermined space between the shaft and the pole pieces.

Other constructions and operations are the same as those in the second embodiment. Therefore, the same components will be described using the same reference numerals.

FIG. 4 is a schematic construction diagram showing a usage state of a magnetic fluid seal according to the fourth embodiment.

In this embodiment, in the same manner, there are formed a plurality of projections 33*a*, 33*b*, and 33*c* on a pole piece 33 and there are also formed a plurality of projections 43*a*, 43*b*, and 43*c* on a pole piece 43.

Here, the construction and other aspects of the projections 33*a* and 33*b* and the projections 43*a* and 43*b* are the same as the construction and other aspects of the projections 31*a* and 31*b* and the projections 41*a* and 41*b* in the aforementioned first embodiment, and therefore are not described.

The present embodiment differs only in the construction and the like of the projections 33*c* and 43*c* that are provided farthest from the permanent magnet 21. Therefore, this difference will be described in detail.

As shown in the drawing, the projections 33*c* and 43*c* are provided at positions that are placed inward (on the permanent magnet 21 side) from end surfaces in the shaft extending direction of the main bodies of the respective pole pieces 33 and 43 (from the end surfaces that are far from the permanent magnet 21).

Also, the distance to wall surfaces K3 and K4, which oppose the interior surface of the housing 61 and exist at positions outward from these projections 33*c* and 43*c* (at positions far from the permanent magnet 21), is set so as to be longer than the distance from the tips of these projections to the interior surface of the housing and also to be shorter than the heights of these projections.

By constructing the magnetic fluid seal in the manner described above, the magnetic fluid is held by the capillary attraction of a narrow space enclosed by the interior surface of the housing 61 and the wall surfaces K3 and K4 opposing the inner peripheral surface. As a result, it is possible to reduce the leakage amount of the magnetic fluid.

Also, in the present embodiment, the aforementioned wall surfaces K3 and K4 are each formed as a tapered surface whose distance to the interior surface of the housing 61 is gradually reduced as directing from the outer side to the inner side.

Further, in the present embodiment, the taper angles of these wall surfaces K3 and K4 are set so that these wall surfaces are inclined toward the shaft direction at an angle of inclination of 5° to 30° with respect to a horizontal plane.

With this construction, it is possible to strengthen the capillary attraction of the narrow space between the interior surface of the housing 61 and the wall surfaces K3 and K4 opposing the interior surface in a direction toward the projections. As a result, it is possible to further reduce the leakage amount of the magnetic fluid.

As described above, with the construction of the present embodiment, it becomes possible to reduce leakage of the magnetic fluid held by the holding projections at positions far from the permanent magnet as well as on the permanent magnet side. This makes it possible to still further improve a sealing property.

Accordingly, it becomes possible to cope with an apparatus in which the reciprocating speeds of a shaft and a housing are high.

With the construction based on the present embodiment, the pressure resistance of a seal is approximately doubled in comparison with a seal having the construction based on the aforementioned second embodiment.

As described above, with the present invention, a space between holding projections that are nearest to a magnetic force generating member is set so as to be shorter than the length of the magnetic force generating member in the shaft extending direction. With this construction, a magnetic fluid is held at positions having strong magnetic field that are placed inward from positions between which there exists a distance equal to a length of the magnetic force generating member. As a result, it becomes possible to suppress leakage of the magnetic fluid and there is realized an excellent quality.

An intercepting seal may be arranged between the holding projections that are nearest to the magnetic force generating member in order to intercept the space between the magnetic force generating member and the surface of the shaft. In this case, there is prevented leakage of the magnetic fluid toward the magnetic force generating member side, which still further improves the sealing property.

The holding projections that are farthest from the magnetic force generating member may be provided at positions that are placed inward from the end surfaces in the shaft extending direction of the main bodies of the magnetic pole members. Also, the distance between the surface of the shaft and the wall surfaces, which oppose the shaft surface and exist at positions outward from these holding projections, may be set so as to be longer than the distance from the tips of the holding projections to the shaft surface and also to be shorter than the heights of the holding projections. In this case, there is prevented a situation where the magnetic fluid held by these holding projections leaks to the outside, which still further improves the sealing property.

The wall surfaces opposing the shaft surface may be each formed as a tapered surface whose distance to the shaft surface is gradually reduced as directing from the outer side to the inner side. In this case, it is possible to further suppress a situation where the magnetic fluid leaks to the outside.

The distance between the holding projections that are nearest to the magnetic force generating member may be set in a range of from 0.1 to 2 mm. In this case, the leakage of the magnetic fluid is effectively prevented.

What is claimed is:

1. A magnetic fluid seal for sealing a circular space between a shaft and a housing, comprising:
    a magnetic force generating member that is arranged so that one end thereof corresponds to a north pole and the other end thereof corresponds to a south pole in a shaft extending direction;
    a pair of magnetic pole members that are respectively provided on both sides of said magnetic force generating member so that the magnetic force generating member is sandwiched therebetween,
    each of said pair of magnetic pole members includes a plurality of holding projections that extend toward a surface of said shaft and hold a magnetic fluid in a space between the holding projections and the shaft surface,
    a distance between the holding projections, which are nearest to the magnetic force generating member among the holding projections of the pair of magnetic pole members, is shorter than a length of the magnetic force generating member in the shaft extending direction, and
    an intercepting seal for intercepting a space between said magnetic force generating member and the shaft surface being provided between the holding projections that are nearest to said magnetic force generating member.

2. The magnetic fluid seal according to claim 1, wherein the holding projections, which are farthest from the magnetic force generating member among the holding projections of said magnetic pole members, are provided at positions that are placed inward from end surfaces in the shaft extending direction of main bodies of the magnetic pole members, and a distance between the shaft surface and wall surfaces, which oppose the shaft surface and exist at positions placed outward from the holding projections that are farthest from the magnetic force generating member, is longer than a distance from tips of the holding projections to the shaft surface and is shorter than heights of the holding projections.

3. The magnetic fluid seal according to claim 2, wherein the wall surfaces opposing said shaft surface are each formed as a tapered surface whose distance to the shaft surface is gradually reduced as directing from an outer side to an inner side.

4. A magnetic fluid seal for sealing a circular space between a shaft and a housing, comprising:
    a magnetic force generating member that is arranged so that one end thereof corresponds to a north pole and the other end thereof corresponds to a south pole in a shaft extending direction; and
    a pair of magnetic pole members that are respectively provided on both sides of said magnetic force generating member so that the magnetic force generating member is sandwiched therebetween,
    each of said pair of magnetic pole members includes a plurality of holding projections that extend toward a surface of said housing and hold a magnetic fluid in a space between the holding projections and the housing surface, and a distance between the holding projections, which are nearest to the magnetic force generating member among the holding projections of the pair of magnetic pole members, is shorter than a length of the magnetic force generating member in the shaft extending direction.

5. The magnetic fluid seal according to claim 4, wherein an intercepting seal for intercepting a space between said magnetic force generating member and a housing interior surface is provided between the holding projections that are nearest to said magnetic force generating member.

6. The magnetic fluid seal according to claim 4, wherein the holding projections, which are farthest from the magnetic force generating member among the holding projections of said magnetic pole members, are provided at positions that are placed inward from end surfaces in the shaft extending direction of main bodies of the magnetic pole members, and a distance between the housing interior surface and wall surfaces, which oppose the housing surface and exist at positions placed outward from the holding projections that are farthest from the magnetic force generating member, is longer than a distance from tips of the holding projections to the housing interior surface and is shorter than heights of the holding projections.

7. The magnetic fluid seal according to claim 6, wherein the wall surfaces opposing said housing interior surface are each formed as a tapered surface whose distance to the housing interior surface is gradually reduced as directing from an outer side to an inner side.

8. The magnetic fluid seal according to claim 7, wherein a taper angle of each of the wall surfaces opposing said housing interior surface is set at 45° or less.

9. The magnetic fluid seal according to claim 8, wherein the wall surfaces opposing said housing interior surface are each formed so that the taper angle is set in a range of from 5° to 30°.

10. A magnetic fluid seal for sealing a circular space between a shaft and a housing, comprising:
    a magnetic force generating member that is arranged so that one end thereof corresponds to a north pole and the other end thereof corresponds to a south pole in a shaft extending direction;
    a pair of magnetic pole members that are respectively provided on both sides of said magnetic force generating member so that the magnetic force generating member is sandwiched therebetween,
    each of said pair of magnetic pole members includes a plurality of holding projections that extend toward a surface of said shaft and hold a magnetic fluid in a space between the holding projections and the shaft surface,
    a distance between the holding projections, which are nearest to the magnetic force generating member among the holding projections of the pair of magnetic pole members, is shorter than a length of the magnetic force generating member in the shaft extending direction, and
    the holding projections, which are farthest from the magnetic force generating member among the holding projections of said magnetic pole members, being provided at positions that are placed inward from end surfaces in the shaft extending direction of main bodies of the magnetic pole members, and a distance between the shaft surface and wall surfaces, which oppose the shaft surface and exist at positions placed outward from the holding projections that are farthest from the magnetic force generating member, being longer than a distance from tips of the holding projections to the shaft surface and being shorter than heights of the holding projections.

11. The magnetic fluid seal according to claim 10, wherein the wall surfaces opposing said shaft surface are each formed as a tapered surface whose distance to the shaft surface is gradually reduced as directing from an outer side to an inner side.

* * * * *